UNITED STATES PATENT OFFICE.

TENNEY L. DAVIS, OF SOMERVILLE, MASSACHUSETTS.

PROCESS FOR THE PREPARATION OF GUANIDINE.

1,417,369.   Specification of Letters Patent.   Patented May 23, 1922.

No Drawing.   Application filed April 16, 1921. Serial No. 462,030.

(FILED UNDER THE ACT OF MARCH 3, 1883, 22 STAT. L., 625.)

*To all whom it may concern:*

Be it known that I, TENNEY L. DAVIS, a citizen of the United States, and a resident of Somerville, county of Middlesex, and State of Massachusetts, have invented an Improvement in Processes for the Preparation of Guanidine, of which the following is a specification.

The invention described herein may be used by the Government, or any of its officers or employees in prosecution of work for the Government, or by any other person in the United States, without payment to me of any royalty thereon.

The subject of this invention is a process for the preparation of guanidine and of salts of guanidine and of guanidine derivatives.

The main object of the invention is the production of guanidine or their salts or derivatives thereof in a pure condition uncontaminated with excess acid or ammonium salts or other impurities.

My invention consists broadly in the use of ammonia as a hydrolytic agent for the preparation of guanidine, and its salts and other derivatives from dicyandiamide.

Although guanidine and its compounds may be prepared in a variety of ways, the process which is of the greatest value and interest is that which involves the hydrolysis of dicyandiamide. Dicyandiamide is readily prepared from calcium cyanamide which is itself produced from calcium carbide and atmospheric nitrogen. When guanidine is prepared from dicyandiamide, the nitrogen which it contains is combined nitrogen obtained ultimately from the atmosphere.

In the best of the hitherto known processes for the preparation of guanidine from dicyandiamide, the dicyandiamide is heated with sulphuric acid of about 60% strength. By treatment with such sulphuric acid it is promptly converted into guanylurea or dicyandiamidine and this substance is later converted, by continued treatment at a higher temperature, into guanidine, carbon dioxide and ammonia. In this process the action of the sulphuric acid is a purely hydrolytic one as is indicated by the following equation.

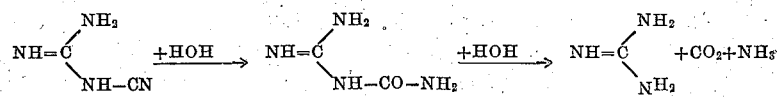

The carbon dioxide escapes, the guanidine combines with sulphuric acid, and the final reaction mixture contains guanidine sulphate, ammonium sulphate, and free sulphuric acid. The process can not conveniently be carried out except in the presence of an excess of sulphuric acid; even if such a procedure were possible the product would still be guanidine sulphate contaminated with a molecular equivalent of ammonium sulphate: in any case the product of the hydrolysis of dicyanidiamide by sulphuric acid is guanidine-sulphate contaminated with other substances to render it unfit for or even impossible of ready conversion into other salts or derivatives of guanidine which may be desired.

I have discovered that other hydrolytic agents, notably sodium carbonate and ammonia, are capable of use for the production of guanidine from dicyandiamide. Sodium carbonate introduces sodium salts into the reaction mixture. This would contaminate the product, and sodium carbonate is not the object of the present patent application. Ammonia on the other hand is volatile and may be blown off after the completion of the reaction by forcing air or steam through the reaction mixture, thus leaving the pure guanidine, in the form of its carbonate, alone in the solution uncontaminated with any impurities. I have found that the reaction gives the best yield when four kilograms of dicyandiamide and 5 liters of ammonia water (specific gravity 0.90) are heated together in autoclave for one hour at 160° C. but I do not wish to claim these particular conditions solely by this patent application. At the end of the heating the ammonia which was introduced and the ammonia which was produced by the reaction are alike blown out by air or steam, and the pure guanidine carbonate which remains in the solution may be treated with the correct amount of sulphuric acid or nitric acid or other reagent for the preparation of whatever pure salt or derivative of guanidine may be desired.

Having described my invention what I claim as new and desire to secure by Letters Patent, is:

1. The process of preparing guanidine, comprising heating a mixture of dycyandiamide and ammonia water, then removing the ammonia from the reaction mixture.

2. The process of preparing guanidine, comprising heating a mixture of dicyandiamide and ammonia water until the reaction is completed and then blowing the ammonia from the reaction mixture by means of a stream of fluid.

3. In the preparation of guanidine from dicyandiamide, the use of ammonia as a hydrolytic agent.

TENNEY L. DAVIS.